March 2, 1948.                    E. J. ISBISTER                    2,436,807
                            ELECTRICAL FOLLOW-UP SYSTEM
                               Filed Dec. 9, 1939
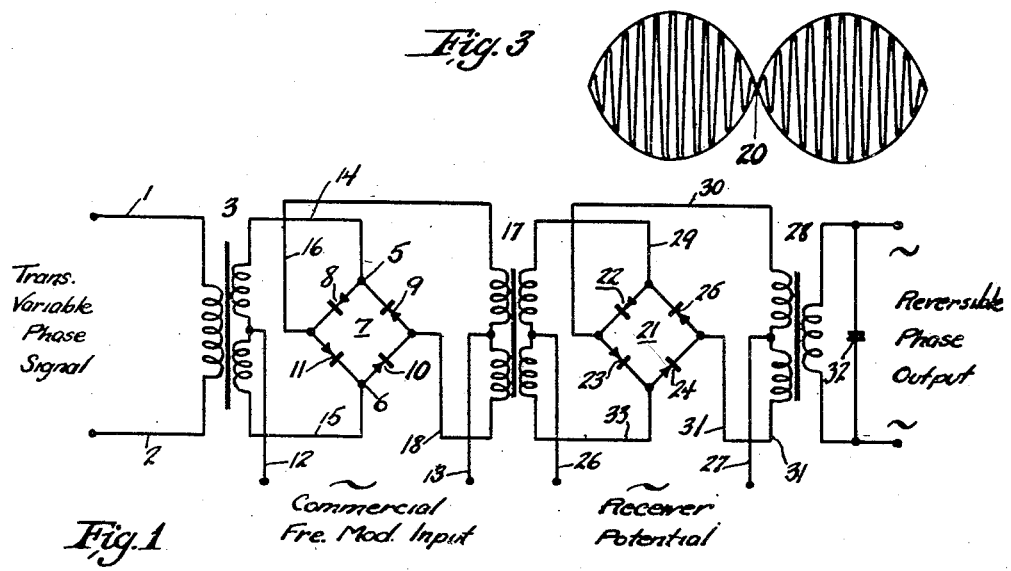
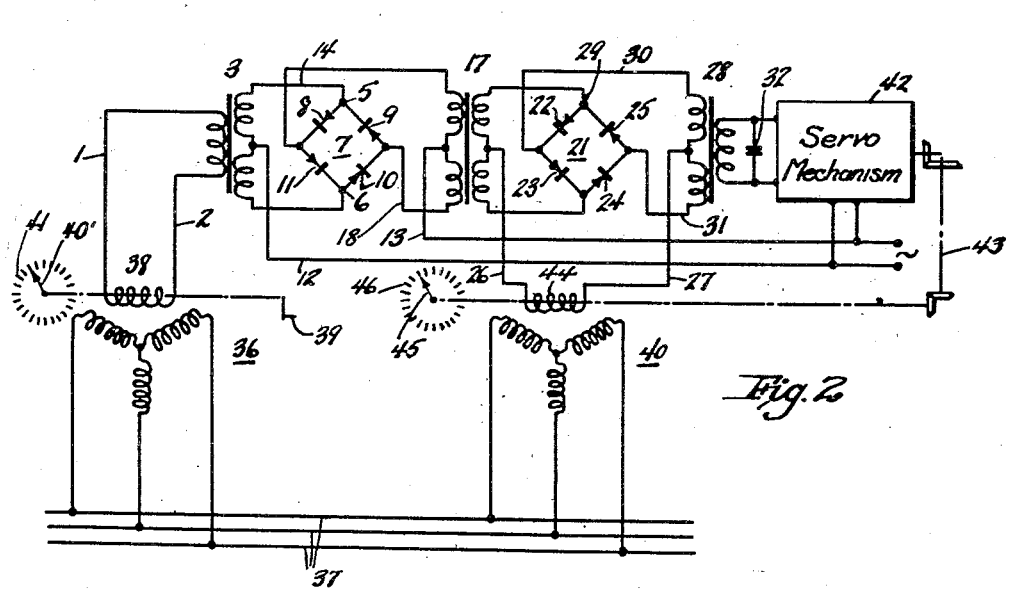
INVENTOR
Eric J. Isbister,
BY
Herbert H. Thompson
his ATTORNEY.

Patented Mar. 2, 1948

2,436,807

UNITED STATES PATENT OFFICE 2,436,807

ELECTRICAL FOLLOW-UP SYSTEM

Eric J. Isbister, Brooklyn, N. Y., assignor to The Sperry Corporation, a corporation of Delaware Application December 9, 1939, Serial No. 308,374

14 Claims. (Cl. 318—30)

This invention relates, generally, to the transmission of data such as angular data or data that are susceptible of indication on a suitable sheet, card or other member having relative movement with respect to a pointer or other designating means, and the invention has reference, more particularly, to a novel data transmission system employing a phase responsive modulator adapted for use in such a system and employing A. C. voltages of fixed electric frequencies but of variable phase position, the phase position varying in accordance with the data transmitted.

In the transmission of data by use of variable phase signals produced by a self-synchronous transmitter-receiver system, as of the "Selsyn" type employing a servo mechanism at the receiving end, it is highly desirable that there be no time lag in the transmission system, because any time lag will cause unstable and inaccurate control of the receiving "Selsyn" by the servo mechanism.

It is an object of this invention to provide a servomotor system in which a signal voltage of a first frequency is converted to a signal voltage of a second frequency which is employed in effecting a phase-sensitive control over a servomotor.

Another object resides in providing a servomotor system in which a signal voltage of a first frequency is modulated with a voltage component of a second frequency, then demodulated using a voltage component of the first frequency to provide a signal voltage of the second frequency which is employed, by comparison with a voltage of the second frequency as a reference voltage, in effecting a phase-sensitive operation of the servomotor system.

Still another object resides in providing a servomotor system in which an input signal voltage of a first frequency is converted to an output signal voltage of a second frequency which reverses in phase in accordance with phase reversals of the input signal voltage and which has an amplitude proportional to the amplitude of the input signal voltage, the output signal voltage, of the second frequency, being employed with a voltage of substantially the same frequency in effecting a phase-sensitive control over the servomotor mechanism.

Another object of this invention is to provide a variable phase data transmission system employing a phase responsive modulator utilizing changes in the time phase difference of two signals of one frequency to produce changes in the amplitude of a fixed phase signal of a different and preferably commercial frequency, to thereby effect control of a servo mechanism without involving any appreciable time lag.

Another object of the present invention is to provide a data transmission system employing a phase responsive or phase-sensitive modulator that is adapted to convert, without introducing any time delay in the system, from the higher frequencies useful for signaling over long lines to the lower, power frequencies useful in operating servo mechanisms.

Other objects and advantages of this invention will become apparent as the description proceeds.

In variable phase data transmission systems, such as the types disclosed in copending applications, Ser. No. 83,844, filed June 6, 1936, for Data transmission and control system, which issued as Patent No. 2,256,482 on September 23, 1941, and Ser. No. 104,364, filed October 7, 1936, for Data transmission and control system, which issued as Patent No. 2,256,487 on September 23, 1941, of which the present applicant and F. L. Moseley are the joint inventors, it is desirable to employ synchro-transmitters and remotely connected receivers operating at frequencies higher than ordinary electric power or commercial transmission frequencies. However, the servo systems controlled by the synchro-receivers are preferably supplied at ordinary power transmission frequencies, such as 60 cycles and, therefore, it is desirable that some means be provided for translating a higher frequency, variable phase, transmitter-receiver signal into a suitable low or power frequency output signal which may be advantageously used in controlling a servo mechanism.

In the drawings,

Fig. 1 is a wiring diagram illustrating the essentials of the phase responsive modulator of this invention.

Fig. 2 is a wiring diagram illustrating the application of the phase responsive modulator to a typical remote controlled servo system of the variable phase type.

Figs. 3 and 4 are graphs illustrating the operation of the phase responsive modulator of this invention.

Referring now to Fig. 1 of the drawings, it will be assumed that a variable phase constant magnitude alternating current signal of a frequency, for example, of 1,000 cycles such as that supplied from a synchro-transmitter-receiver system is supplied from leads 1, 2 to the input transformer 3 having the ends of its center-tapped secondary winding connected to opposite points 5 and 6 of a modulator 7 shown as a ring type modulator employing dry disk rectifiers 8, 9, 10 and 11 which may be of the selenium oxide or copper oxide type. This modulator is also supplied with a constant phase and magnitude A. C. voltage of commercial frequency such as 60 cycles through leads 12 and 13 connected to the center taps of the secondary winding of transformer 3 and the primary winding of transformer 17, respectively.

Thus, if it is assumed that lead 12 is positive for the moment, and that the 1,000 cycle voltage is zero, current will flow from this lead, through the two halves of the secondary of transformer 3 through leads 14 and 15 to points 5 and 6 of modulator 7. The portion of the commercial frequency current flowing through point 5 will pass through rectifier 8 and out through lead 16 through one half of the primary of the coupling transformer 17 back to lead 13. The current passing through point 6 will flow through rectifier 10 and out through lead 18, through the lower half of the primary of transformer 17 and back to lead 13. Thus, this commercial frequency current acting alone impresses no voltage upon the secondary of coupling transformer 17 since it causes opposite and equal currents to flow in the primary of this transformer. During the other half cycle when lead 12 is negative, the operation is similar to that explained above except that the current flows through rectifiers 9 and 11.

In operation as a modulator, the commercial frequency, i. e., the sixty cycle carrier, for example, supplied through leads 12 and 13 is assumed to be considerably larger in magnitude than the higher frequency signal supplied from leads 1 and 2, i. e., for example, a thousand cycle variable phase signal. During the half of the sixty cycle wave in which lead 12 is positive, current flows through rectifiers 8 and 10 but is prevented from flowing through rectifiers 9 and 11, as above explained. Under this condition, the thousand cycle signal current supplied from the secondary of transformer 3 flows through lead 14, rectifier 8, lead 16, the primary of transformer 17, lead 18, rectifier 10, lead 15 and back to transformer 3. This thousand cycle current flows reversely through the same path when the thousand cycle current reverses its instantaneous polarity. Because of the nonlinear characteristic of the rectifier resistance more thousand cycle current is allowed to flow as the sixty cycle increases in magnitude during each half cycle so that the thousand cycle voltage appearing across the primary of transformer 17 has its amplitude increased and decreased, i. e., modulated at a sixty cycle rate.

During that half of the cycle when lead 12 is negative, current flows through rectifiers 9 and 11 only. This results in a reversal of the direction of flow of the thousand cycle current in the primary of transformer 17 corresponding to a 180° shift in phase of this signal with respect to the signal supplied to leads 1 and 2; the voltage appearing across the secondary of transformer 17 is shown in Fig. 3. Note the reversal of phase of the thousand cycle signal at point 20.

The demodulator 21 is supplied with thousand cycle constant magnitude carrier from leads 26 and 27. Now assuming the signal from modulator 7 to be zero, the current flow in demodulator 21 is similar to that described in connection with the supply of sixty cycle current through leads 12 and 13. Once again the amplitude of the carrier from 26, 27 is assumed to be considerably greater than that of the signal from modulator 7. Assuming for the moment that lead 26 is positive and that the signal from modulator 7 is in phase with the thousand cycle carrier fed through leads 26 and 27 and that the signal from the modulator 7 has its instantaneous polarity such that lead 29 is positive, then the signal voltage across the upper half of the secondary of transformer 17 and the carrier voltage will be additive. Current due to the sum of these voltages will flow through lead 29, rectifier 22, lead 30 down through the upper half of the primary of transformer 28 and to lead 27. At the same time, the current due to the carrier and the voltage across the lower half of the secondary of transformer 17 will flow through lead 33, rectifier 24, lead 31 and up through the lower half of the primary of transformer 28 to lead 27. These currents tend to cancel in the transformer 28 but because the signal voltage across the lower half of transformer 17 and the carrier are opposed or 180° out of phase, they subtract so that the current flowing up through the lower half of the primary of transformer 28 is less than the current flowing down so that there is a net current flowing down.

During the next half cycle of the carrier, when lead 26 is negative, the instantaneous polarity of the voltage from modulator 7 has also reversed, so that operation is then the same as above described except that current flows through the rectifiers 25 and 23, while the net current flowing in the primary of transformer 28 is still down. This results in a series of D. C. pulses in the primary of transformer 28 but as the amplitude of the signal from modulator 7 is increasing and decreasing at a sixty cycle rate, the pulses in the primary of transformer 28 increase and decrease at a sixty cycle rate and when the phase of the signal from modulator 7 reverses with the change in instantaneous polarity of the sixty cycle carrier supplied to modulator 7, the direction of flow of the net current in the primary of transformer 28 reverses thereby supplying the negative half of the sixty cycle output component. The form of the net voltage across the secondary of transformer 28 is shown in Fig. 4. The condenser 32 across the secondary of transformer 28 serves to smooth out the thousand cycle pulses giving a smooth sixty cycle wave for the output of the device.

If the phase of the thousand cycle signal supplied to leads 1 and 2 is 90° out of phase with the thousand cycle carrier supplied to demodulator 21, the operation of modulator 7 is the same as that above described. The operation of the demodulator 21 differs, however, as will now be described. During one half of that half of the cycle in which lead 26 is held positive by the carrier supplied by leads 26 and 27, the net current in transformer 28 will be down. In the second half of this half cycle the voltage from the modulator 7 reverses in phase and the net current is up. Due to the filtering properties of condenser 32, these pulses cancel and there is no net output. In the second half cycle of the carrier when lead 26 is negative, operation is similar and there is no net current output.

In Fig. 2, the modulator of this invention is shown applied to a data transmission system of the variable phase type. Parts of Fig. 2 which correspond to Fig. 1 are similarly numbered. In Fig. 2, the synchro-transmitter 36 has its three-phase stator supplied with 1,000 cycle A. C., for example, from the three-phase leads 37 while its single phase rotor 38 is adapted to be turned as by handwheel 39, the same being illustrated as operating a pointer 40' over a scale 41, the pointer cooperating with the scale which designates certain data intended to be transmitted. The output of winding 38 shifts in phase one degree with each degree that the handwheel 39 is turned. This is fed into the input transformer 3 as in Fig. 1 and is modulated with the voltage derived from the sixty-cycle supply leads 12 and 13. The modulated signal is then fed through the coupling transformer 17 to the demodulator 21. Here the signal is demodulated by the constant magnitude one thousand cycle supply from synchro-receiver 40 supplied, in turn, from leads 37. The demodulated output is supplied through transformer 28. The condenser 32 bypasses the one thousand cycle output component from the output leaving only the sixty cycle output for application to the servo mechanism 42, which may be of the type illustrated in the aforementioned applications.

If the one thousand cycle signal supplied from transformer 17 is 90° out of phase with the one thousand cycle voltage supplied from synchro-receiver 40 to the demodulator, no demodulation will take place in demodulator 21 and there will be no sixty cycle output. If the one thousand cycle signal is in phase with the one thousand cycle supply from synchro-receiver 40 through leads 26 and 27, there will be a maximum of demodulation and a maximum sixty cycle output to the servo mechanism 42. If the phase of the signal is then shifted 180° with respect to the supply from synchro-receiver 40, there will also be a maximum of demodulation and sixty cycle output, but the phase of the sixty cycle output will be shifted 180°. As the phase of the one thousand cycle signal input varies smoothly through 180° of phase shift starting from a point 90° out of phase with the demodulating one thousand cycle supply from synchro-receiver 40, the sixty cycle output voltage will rise smoothly from zero to a maximum at 90° and drop smoothly to zero at 180°. The cycle will repeat as the input passes through the second 180° of phase shift. The phase of the sixty cycle output will remain constant throughout each rise and fall of the signal magnitude but will shift 180° as the output magnitude passes through the zero points, assuming the input change in phase continues in the same sense or direction.

The driving motor of the servo mechanism 42 is connected through suitable mechanical transmission means 43 for driving the rotor 44 of the synchro-receiver 40, the means 43 also serving to position a pointer 45 on scale 46 corresponding to similar elements 40'—41 at the transmitter.

In operation, the servo mechanism will turn the rotor of the synchro-receiver 40 until the sixty cycle output through transformer 28 is zero in magnitude. The phase of the sixty cycle output controls the direction of rotation of the servo system while the magnitude determines the speed of rotation, therefore the servo mechanism 42 will cause the rotor 44 of the synchro-receiver 40 to follow the synchro-transmitter rotor 38 in position and speed with only a small angular lag even if rotating at high speed, thereby moving pointer 45 over scale 46 in synchronism with the movement of pointer 40' over scale 41. Thus, the novel system of the present invention, when applied to synchro-transmission systems, serves to convert from the higher frequencies useful for signalling over long lines to the power commercial frequencies for operating the servo mechanism and without introducing any time delay in the system. This is a very definite advantage because any time delay introduced at any point in the system will cause unstable and inaccurate control of the synchro-receiver by the servo mechanism.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Having described my invention, what I claim and desire to secure by Letters Patent is:

1. A synchro-transmitter-receiver system having a synchro-transmitter and synchro-receiver operating at a non-commercial frequency, a modulator fed from said synchro-transmitter, means for supplying a constant phase and magnitude commercial modulating frequency to said modulator, a demodulator fed from said modulator and supplied from said synchro-receiver with a demodulating potential, and a servo mechanism controlled from said demodulator, said servo mechanism being connected for operating said synchro-receiver for movement in synchronism with said synchro-transmitter.

2. In a data transmission system, a synchro-transmitter, means for exciting said transmitter at a frequency differing from ordinary commercial frequencies, a modulator for receiving the variable phase constant magnitude output of said synchro-transmitter, means supplying a commercial frequency constant phase and magnitude modulating potential to said modulator, the output of said modulator comprising said synchro-transmitter signal amplitude modulated at said commercial modulating frequency which output is reversible in phase with reversals in the direction of rotation of said synchro-transmitter, a demodulator supplied with said modulated signal, a synchro-receiver connected to said demodulator for supplying the same with a demodulating potential of the same frequency as the signal output of said synchro-transmitter, and a servo mechanism supplied with the commercial frequency, reversible phase output of said demodulator, said synchro-receiver being connected to be operated from said servo mechanism.

3. In a variable phase data transmission system, a ring type modulator, transformer means for supplying said modulator with a variable phase, constant magnitude higher frequency input, means for supplying said modulator with a commercial frequency, constant phase and magnitude modulating input, output transformer means connected to said modulator, a demodulator supplied from said output transformer means, means for variably supplying said higher frequency as a demodulating input to said demodulator, a servo system, an output transformer connecting said demodulator to said servo system, and capacity means connected across said output transformer for bypassing the higher frequency component output of said demodulator, said servo system being connected to operate said means for variably supplying the higher frequency input to the demodulator.

4. In a variable phase data transmission system, a modulator device, transformer means for supplying said modulator with a variable phase, constant magnitude higher frequency input, means for supplying to said device a lower frequency modulating input of constant phase and magnitude, a ring type demodulator, inductive means coupling the output of said device to said demodulator, means supplying to said demodulator an input of said higher frequency, a servo system, a second inductive means coupling said demodulator to said system, and means in parallel with said system to bypass said higher frequency, said servo system being connected to operate said means for supplying the input of higher frequency to said demodulator.

5. In a variable phase data transmission system, a phase responsive modulator device, transformer means for supplying said modulator with a variable phase, constant magnitude higher frequency input, means for supplying to said modulator a lower frequency input of constant phase and magnitude, output transformer means connected to said modulator, a demodulator supplied from said transformer means, means supplying a demodulating input of said higher frequency to said demodulator, a servo system, conductive means coupling said demodulator to said system, and means in parallel with said system to bypass said higher frequency, said servo system being connected to operate said means for supplying the demodulating input of higher frequency to said demodulator.

6. In a variable phase data transmission system, a phase responsive modulator, means to supply variable phase higher frequency and constant phase lower frequency to said modulator, a demodulator inductively fed from said modulator, means to supply said higher frequency in said demodulator, means connected to be supplied by the output of said demodulator for operating said means supplying the higher frequency to said demodulator, and means in parallel with said last means to bypass said higher frequency.

7. In a system of the character described, a motor adapted to operate on electrical energy of a first frequency, a source of voltage of a second frequency differing from said first frequency, means for deriving from said source a signal voltage of said second frequency, a source of voltage of said first frequency, means for modulating said signal with a voltage of said first frequency, means for demodulating the modulated signal, said demodulating means being supplied with a demodulating potential from said voltage source of second frequency, and the output of said demodulating means being connected in controlling relation to said motor.

8. In a system of the character described, a motor adapted to operate on electrical energy of a first frequency, a source of voltage of a second frequency differing from said first frequency, means for deriving from said source a signal voltage, a source of voltage of said first frequency, means for modulating said signal with a voltage of said first frequency, means for demodulating the modulated signal, said demodulating means being supplied with a demodulating potential from said voltage source of second frequency, the output of said demodulating means being connected in controlling relation to said motor, and means controlled by said motor for modifying the demodulating potential supplied to said demodulating means.

9. In a data transmission system, a first source of voltage of a first frequency, means for deriving from said source a signal voltage and for varying the phase thereof, a second source of voltage of a second frequency differing from said first frequency, means for modulating said signal with a voltage of said second frequency, means for demodulating the modulated signal, said demodulating means being supplied with a demodulating potential from said first voltage source, and a motor connected with said second voltage source and with the output of said demodulating means to be controlled in its operation thereby.

10. In a data transmission system, a first source of voltage of a first frequency, means for deriving from said source a signal voltage and for varying the phase thereof, a second source of voltage of a second frequency differing from said first frequency, means for modulating said signal with a voltage of said second frequency, means for demodulating the modulated signal, said demodulating means being supplied with a demodulating potential from said first voltage source, a motor connected with said second voltage source and with the output of said demodulating means, and means controlled by said motor for varying the phase of said demodulating potential supplied to said demodulating means.

11. In a system of the character described, a motor adapted to operate on electrical energy of a first frequency, a source of voltage of a second frequency differing from said first frequency, means for deriving from said source a signal voltage of said second frequency, a source of voltage of said first frequency, means for modulating said signal with a voltage of said first frequency, means for demodulating the modulated signal, said demodulating means being supplied with a demodulating potential from said voltage source of second frequency, said motor being connected with said voltage source of first frequency and with the output of said demodulating means.

12. In a system of the character described, a motor adapted to operate on electrical energy of a first frequency, a source of voltage of a second frequency differing from said first frequency, means for deriving from said source a signal voltage, a source of voltage of said first frequency, means for modulating said signal with a voltage of said first frequency, means for demodulating the modulated signal, said demodulating means being supplied with a demodulating potential from said voltage source of second frequency, said motor being connected with said voltage source of first frequency and with the output of said demodulating means, and means controlled by said motor for varying the demodulating potential supplied to said demodulating means.

13. In a system of the character described, a synchronous type transmitter, a synchronous type receiver, a first source of voltage of a first frequency connected to energize said transmitter and receiver, a second source of voltage of a second frequency differing from said first frequency, modulating means connected with said transmitter and said second voltage source, demodulating means energized from said receiver and connected to receive the modulated signal, and a servo mechanism controlled by the output of said demodulating means and connected to operate said receiver in synchronism with said transmitter.

14. In a system of the character described, a reference member, a first source of voltage of a first frequency, a signal generator operated with said member and energized from said first voltage source for supplying signal voltages of said first frequency, a second source of voltage of a second frequency differing from said first frequency, a modulator-demodulator arrangement comprising a modulator device connected to receive signal voltages of said first frequency and energized from said second voltage source and a demodulating device connected to receive the modulated signal and energized from said first voltage source, a signal transformer connected to supply signals of said first frequency to said modulator-demodulator arrangement, and a servo motor controlled by the output of said modulator-demodulator arrangement and connected to operate said transformer.

ERIC J. ISBISTER.

REFERENCES CITED

The following references are of record in the file of this patent:

UNITED STATES PATENTS

| Number | Name | Date |
|---|---|---|
| 1,576,195 | Junken | Mar. 9, 1926 |
| 1,999,645 | Wittkuhns | Apr. 30, 1935 |
| 2,040,014 | Moseley | May 5, 1936 |
| 2,025,158 | Cowan | Dec. 24, 1935 |
| 2,136,606 | Bendel | Nov. 15, 1938 |
| 2,060,142 | Urtel et al. | Nov. 10, 1936 |
| 2,165,764 | Pitsch | July 11, 1939 |
| 2,164,383 | Burton | July 4, 1939 |
| 2,191,315 | Guanella | Feb. 20, 1940 |